(12) United States Patent
Kuo (10) Patent No.: US 6,339,333 B1
(45) Date of Patent: Jan. 15, 2002

(54) DYNAMIC ELECTROMAGNETIC METHODS FOR DIRECT PROSPECTING FOR OIL

(75) Inventor: John T. Kuo, Blauvelt, NY (US)

(73) Assignee: Profile Technologies, Inc., Roslyn, NY (US)

( * ) Notice: Subject to any disclaimer, the term of this patent is extended or adjusted under 35 U.S.C. 154(b) by 0 days.

(21) Appl. No.: 09/523,317

(22) Filed: Mar. 10, 2000

Related U.S. Application Data (60) Provisional application No. 60/123,929, filed on Mar. 12, 1999.

(51) Int. Cl.[7] ................................................. G01L 3/12

(52) U.S. Cl. ..................................................... 324/337

(58) Field of Search .................................. 324/337, 332, 324/334, 344, 347, 354, 357

(56) References Cited

U.S. PATENT DOCUMENTS 2,077,707 * 4/1937 Melton ........ 324/337
2,919,397    12/1959 Morley

\* cited by examiner

Primary Examiner—Walter Snow
(74) Attorney, Agent, or Firm—Robert B. Hughes; Hughes & Schacht, PLLC (57) ABSTRACT

This patent application is to use dynamic electromagnetic wave reflection and refraction methods for prospecting for oil directly. The available geophysical methods including the most used seismic reflection method are all prospecting for oil indirectly, viz., aiming at finding the geological structures and stratigraphic traps, etc. The high contrasts of electric permittivity between oil cord the surrounding geological formations of rocks including gas, water (fresh and salt), on the other hand, make it possible to use the dynamic electromagnetic wave reflection and refraction methods for prospecting for deep seated oil directly.

18 Claims, 7 Drawing Sheets

FIG. 2
TYPE OF SOURCES

2A.) STEP OR HEAVISIDE:

2B.) SWEEP OR CHIRPING:
i) LOW  HIGH
ii) HIGH  LOW - REVERSE OF i)

2C.) RANDOM:

FIG. 2A-1

(a) A SQUARE-WAVE PULSE;
(b) A GAUSSIAN-FUNCTION PULSE, OR THE FIRST DERIVATIVES OF (a)
(c) THE SECOND DERIVATIVES OF (c)

FIG. 2A-1-bA

THE GAUSSIAN SOURCE FUNCTION:
$(a/\pi)^{1/2} \exp[-a(t-f_0)^2]$

FIG. 2A-1-bB

THE AMPLITUDE SPECTRUM OF THE
SOURCE FUNCTION: $\exp(-\pi^2 f^2/a)$.

THE SOURCE APPARATUS: CONSISTING OF THE MULTI-TURN COIL AND DIRECTIONAL PARABOLIC REFLECTOR

DYNAMIC ELECTROMAGNETIC METHODS FOR DIRECT PROSPECTING FOR OIL

RELATED APPLICATIONS

This application claims priority of U.S. Provisional Application Ser. No. 60/123,929, which was filed on Mar. 12, 1999.

BACKGROUND OF THE INVENTION

I have been interested in finding a direct means fox prospecting far oil for some time, although I have spent my entire career of nearly a half century in geophysical prospecting for oil, including the most widely used methods of seismic prospecting for oil. All geophysical is methods including the must used seismic reflection method have been indirect, i.e., aiming at finding structures, stratigraphic traps, or inferring lithological characteristics only. The chance of finding oil for the seismic techniques is about one in six to seven. In the present invention, the chance of finding oil will be about one in two to three.

The electromagnetic (EM) wave propagation depends primarily an the electric permittivity of the earth materials of rocks, while the conductivity of these earth materials is very low and the magnetic permeability is virtually constant. How the dynamic electromagnetic wave methods of this provisional application differ from any other methods lies in the fact using the physical properties of the oil itself in contrast to surrounding rocks of geological formations, gas, and water. Oil has an extremely low electric permittivity or dielectric constant, which is about 4 with an electromagnetic wave velocity of 50 m/us while fresh or salt water has a value of permittivity 81 with an electromagnetic wave velocity of 33 m/us. Surrounding sediments, usually say limestone, which has a value of permittivity 7–16 with an electromagnetic wave velocity of 75–113 m/us and that for sandstone 5–15 with an electromagnetic wave velocity of 77–134 m/us. It is these ideal electric permittivity contrasts that provide a means to use dynamic electromagnetic method for direct prospecting for oil.

FIELD OF THE INVENTION

The present invention relates to direct prospecting for oil in any environment worldwide at various depths. Using an extremely broad band of electromagnetic waves, this electromagnetic wave prospecting method should penetrate various depths which could be comparable to the penetration of seismic waves. Most importantly it would provide a means to directly identifying where the oil is and find the interfaces between the water and oil, as the permittivity of the water is 81 with an electromagnetic wave velocity 300 m/us.

BACKGROUND ART

During the last two decades, ground penetrating radar has been employed in shallow depth ranging from the surface to about 50 to 100 meters, which are operated in the radar frequency ranges of 50 to 1,000 mHz solely based on antenna source and antenna receivers.

This patent application is solely for prospecting for oil directly using frequency range from as low as DC to radar frequency, covering from the surface to a depth of greater than 3,000 meters or more for deep seated oil deposits. The art of achieving such a depth penetration must rely upon the design of the sources as well as the receivers, which will be expounded in the following section.

DESCRIPTION OF THE PREFERRED EMBODIMENTS

The essential part of this patent application is divided into two designing sections of the source and receiver, and one section on practice in the field.

1. The Source

In order to have the electromagnetic waves to penetrate to a depth of 3,000 m or more, a very low-frequency in the radio LF to UHF frequency range type of electromagnetic source is required, which would have the capability of delivering the power in the range of at least 10 to 100 kw or more with a voltage of 1,000 volts or more and a current of 10 to 100 Amperes or more.

1.) Pulse Excitation

An electric pulse of 1-ms pulse width or wider pulse width so that the one-sided positive excitation of the source arid one-sided negative excitation can be used as shown in FIG. 1a. The first derivatives of these two pulses are the Gaussian functions as shown in FIG. 1b. The second derivatives are the typical wave forms of one peak and one trough shown in FIG. 1c. The Gaussian-function source in the form of (a/), ½ exp [-a(t-to)2], where the time is so chosen such that the function normalized by its peak value is nearly zero shown to FIG. 2a the pulse width of which is defined as w=4 o where o=(2a) ½ is the standard deviation of the Gaussian-pulse, which represents the decay time of the electric current; their amplitude spectrum is also a Gaussian which is in the form of exp(-2f2/a), where f is the frequency in Hz and fc is the cut-off-frequency as shown an FIG. 2b is defined here as the frequency at which the amplitude has decayed to e-1 or 0.3679 times the peak value. All the derivative sources are continuous.

The return reflections at the depth of 3,000 m or deeper reach the surface by only the one-sided positive excitation and would be approximately 60 us or 30 us each way or longer, i.e., downward and upward of the pulse, before the one-sided negative pulse excites the source mechanism, which will be described in the sequel.

2.) Chirping or Sweeping Source:

Another source excitation can be easily achieved by means of a chirping or sweeping frequencies. The sweeping-frequency source can be from the low to high frequency or from the high to the low frequency. The near-vertical reflections from the depth can be processed by means of correlation techniques.

Frequency range would be from 0.10 to 100 mHz, corresponding to the wavelength fox a high-end average limestone velocity of 100 m/us from 1,000 m to 1 m. Despite the radio LF frequency, the high contrast of the impedance at the oil/salt water interface would produce a strong reflection.

Apparatus

Now the invention of the apparatus of the source and receiver is described in the following;

1.) The Source Apparatus

Figure 3:
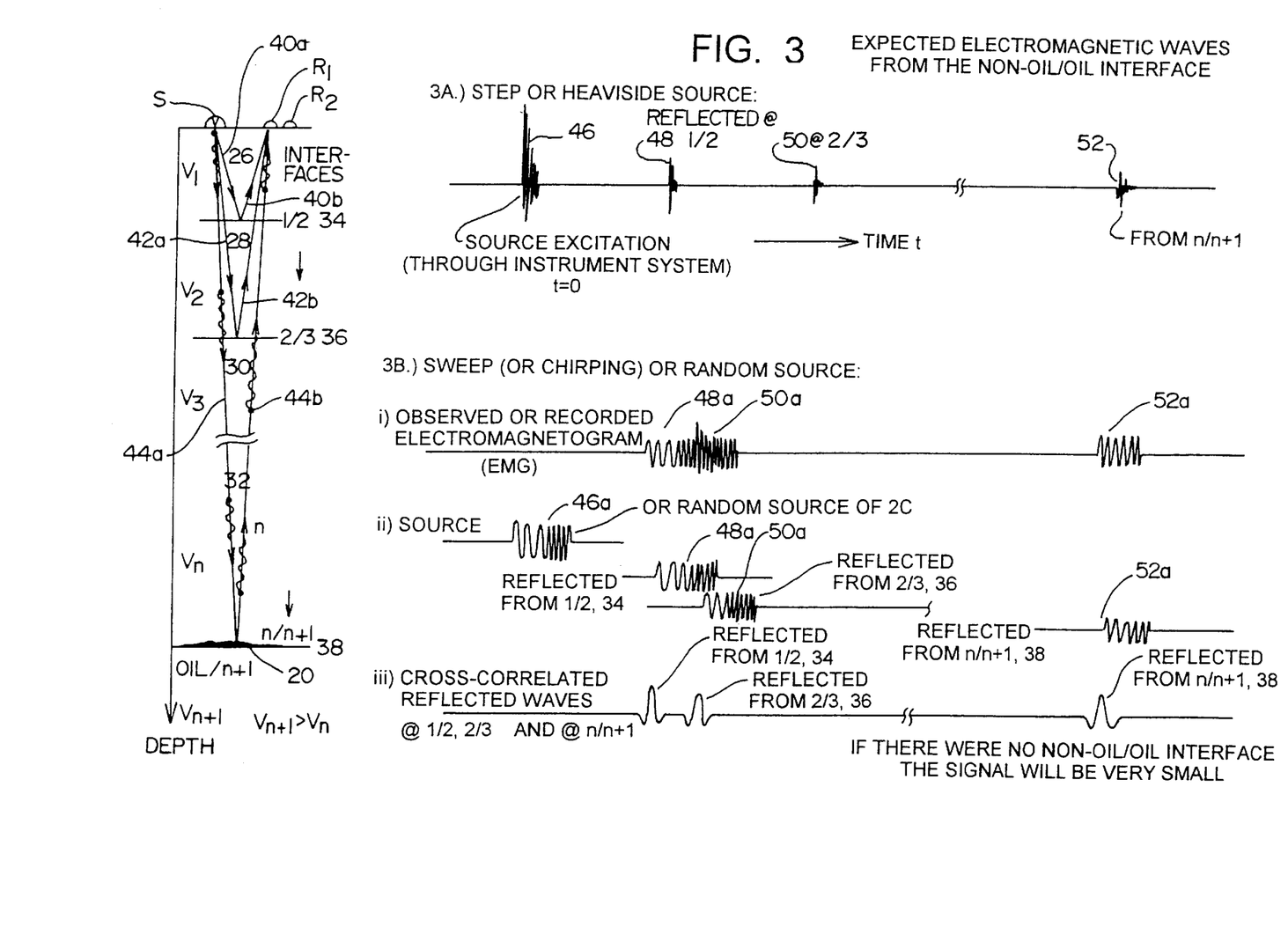
FIG. 3 is a schematic view taken along a vertical plane extending from the earth's surface to the oil bearing formation, illustrating the transmission and reflection form.

The source apparatus consists of an electromagnetic pulse, impulsive or chirping, generated multi-turn coil, which would in turn generate magnetic field the capacity to produce the power, in turn, the field will be directed by a parabolic directional reflector into the earth as shown in FIG. 3. The source multi-turn-coil/parabolic-reflector does not need to be limited to only single one source but it could be a multi-source consisting of a number of multi-turn-coil/parabolic-reflectors which could be steered to give a boon-forming synchronization.

A current is introduced to the mild-turn coil, where the terminal of the incoming current is designated as positive and the terminal of the outgoing current is designated as the negative, there is an applied voltage across these two terminals. For the present application, the voltage will be about 1,000 volts or more and the current be between 10 to 100 Amperes or more to provide adequate power for electromagnetic wave propagation into a greater depth in the earth.

The present source is geometrically symmetrical with respect to the center of the well and the vortex of the parabolic reflector.

2.) The Receiver Apparatus

The receiver apparatus consists of a multi-channel data acquisition system. Each channel is equipped by a directional impedance-matched antenna, which is capable of receiving wide-band electromagnetic signals. Receivers are formed in a variety of patterns with respect to the location of the source(s), namely a linear or areal coverage, or a radial coverage.

The number of channels depends on the subsurface coverage for the electromagnetic imagery. Normally, at least a 48 or 96 channels are required for such an electron wave reflection prospecting for oil directly.

SUMMARY OF THE INVENTION

The present invention fundamentally differs from any prior-art patents to be cited below owing to the fact that I discovered first the fact that the propagating part of the electromagnetic wave primarily depends on the electric permittivity of the medium which for the oil is extremely low. The interface between the geological formation including sedimentary rocks, namely, sandstone, shale, limestone, and any other rocks as a upper medium, and the sedimentary rocks containing oil as a lower medium provides strong reflection and refraction of electromagnetic waves. Upon this discovery, I then searched in vain to find the prior art inventions as available or patented. I was forced to invent on my own an apparatus and system explicitly for direct-finding oil in all the depth of the oil desposits to be elaborated in the sequel.

With the basic operation of the system having been described above, let us now discuss the underlying phenomena involved which enables this system to be directly find oil. The system of the present invention uses a transient time-domain electromagnetic pulse, a sweep-frequencies, from low to high, from high to low, and a predesignated time domain electromagnetic waves as an excitation source.

The technique utilized in the system of the present invention has been designated by the inventors as "True Electromagnetic Waves." (abbreviated to TEMW as TM). The propagation of a transient time-domain pulse, a sweep of frequencies or a predesignated electromagnetic wave train is fundamentally a dynamic electromagnetic phenomenon. It is completely governed by the electromagnetic wave equations, which are derived from Maxwell's Equations, upon which the present invention is based. Details of the fundamentals of the transient electromagnetic waves are referred to an earlier patent application Ser. No. 08/807,645, filed on Feb. 27, 1997.

In the method of the present invention, the prospecting for oil is done directly by ascertaining presence of oil in the earth, where there are upper, non-oil bearing geological formations which are in contact with an oil bearing geological formation immediately below to form a distinct non-oil/oil interface.

More specifically, the method comprises transmitting an electromagnetic wave or waves downwardly through the first formations to said interface, with the wave or waves being reflected and/or refracted upwardly from the interface as reflected and/or refracted wave or waves.

These reflected and/or refracted wave or waves are received at a receiving location or locations, with the reflected and/or refracted wave or waves having a reflected and/or refracted waveform or waveforms that would directly indicate the presence of oil.

The reflected and/or refracted wave form or forms are analyzed to ascertain a presence of a wave characteristic or characteristics found in a reflected and/or refracted wave or waves that are reflected and/or refracted from a non-oil/oil bearing interface.

REVIEW OF RELEVANT PAST PATENTS

In the advent of fundamental understanding of the time-domain electromagnetic wave propagation and rapid processes in technology made in the petroleum industry mainly during the last half century, the present invention is the culmination of the true time-domain electromagnetic waves embodying all the frequencies according to the spectrum of the dynamic transient time-domain electromagnetic waves as excited at the source. Some of the previous patents are dated back to more than a half century ago. The inventors even then reflected the inventive farsightedness but after all did not have the predictive insight to the future and stayed solely in the frequency-domain.

The patents of which possess a different degree of relevant prior-art relevance of the present patent application are eleven as follows. We shall examine these patents in a chronologically reversed order:

1. U.S. Pat. No. 5,147,753 (Etten and Brown, 1994) dealt primarily with the instrumentation of an earth probing system and uses deep penetration of electromagnetic waves into soil and other media. Advantage was taken of the low attenuation of radar waves in soil by frequencies of above three megahertz or less.

2. U.S. Pat. No. 4,504,833 (Burke was related to pulse radar detection of targets and extended media, including natural phenomena such as oil, coal and oil deposits within the earth.

3. U.S. Pat. 4,504,813 (Fowler et al., 1985) was related to a synthetic pulse radar for detecting geophysical phenomena generically.

4. U.S. Pat. No. 4,245,191 (Schroeder, 1981) dealt with a transmitter and a receiver in the frequency domain with an unmodulated carrier of selected wave length into the ground for detecting inclusions in subsoil only.

5. U.S. Pat. No. 3,806,795 (Morey, 1974) was essentially the pre-generation of ground penetrating radar system now nearly developed commercially for a very shallow depth of 8 to 10 feet.

6. U.S. Pat. No. 2,953,742 (Herbold et al, 1960) comprised mainly a generator, a capacitor, And adjustable spark gap terminals. The latter was used there between arranged to discharge the said capacitor into the antenna and generate an electromagnetic wave front into the shallow depth of the earth.

7. U.S. Pat. No. 2,766,422 (Carbonetto, 1956) intended to generate a modulated carrier wave by a high frequency carrier wave to be modulated with a relatively low-frequency wave in the frequency-domain. The radiation of the modulated carrier wave then was used as the source for penetrating the ground and to observe the radiation f the reflected wave.

8. U.S. Pat. No. 2,426,918 (Barret, 1947) addressed electric prospecting in the frequency-domain of mapping the near surface subsurface zones by means of varying the frequency of the incident wave and observing the reflected wave.

9. U.S. Pat. No. 2,268,106 (Blau, 1941) dealt with utilizing commercial broadcasting stations and receiving dealt with radio waves or electromagnetic waves of radio frequencies.

10. U.S. Pat. No. 2,139,460 (Potapenko, 1938) was based upon the inventor's discovery of that crude oil has a selective absorption for electromagnetic radiation corresponding to the part of its spectrum of short and ultraviolet radio waves. The patent dealt with two specific different frequencies.

11. U.S. Pat. No. 2,077,707 (Melton, 1937) dealt with an improvement in electrical prospecting shallow subsurface prospecting to determine the character and location of shallow geological formations mentioning reflection and refraction impulses.

12. U.S. Pat. No. 1,818,331 (Jakosy, 1931) dealt with electrical inductive methods only for prospecting electrically conductive underground ore bodies.

None of the patents which have been searched addressed the fact of the electric permittivity of oil is extremely low at about 4 in comparison with other that of any of the geological media as well as water and gas. The interface of any known geological media including shale, sandstone, limestone, siltstone, mudstone, etc. with the oil provided a means of strong reflections of electromagnetic waves for the near vertical reflection method and of strong refractions for the wider-angle refraction method. The discovery of this very fact is the essence of the present invention for direct finding oil. The depth to which the present invention hereby referred extends from a shallow depth of 1,000 to 5,000 feet to an optimal depth of 10,000, 15,000 feet or greater at which most of the known oil deposits were found (see figures attached).

BRIEF DESCRIPTION OF THE DRAWINGS

FIGS. 2A-1 illustrate a pulse width, and its first and second derivatives;

FIGS. 2A-1 bA and 2A-1-bB are the Gaussian source and the amplitude spectrum, respectively;

FIGS. 3A and 3B illustrate the waves that are reflected from the interfaces 1/2, 2/3, and 4/4 H as shown in FIG. 3 and shows the reflected waveforms of the cross-correlation between the source and the reflected waves.

DESCRIPTION OF THE PREFERRED EMBODIMENTS

It is believed that an understanding of the present invention can be provided more readily by first describing generally the overall system and method of the present invention, and then discussing various details of the same.

Figure 1:
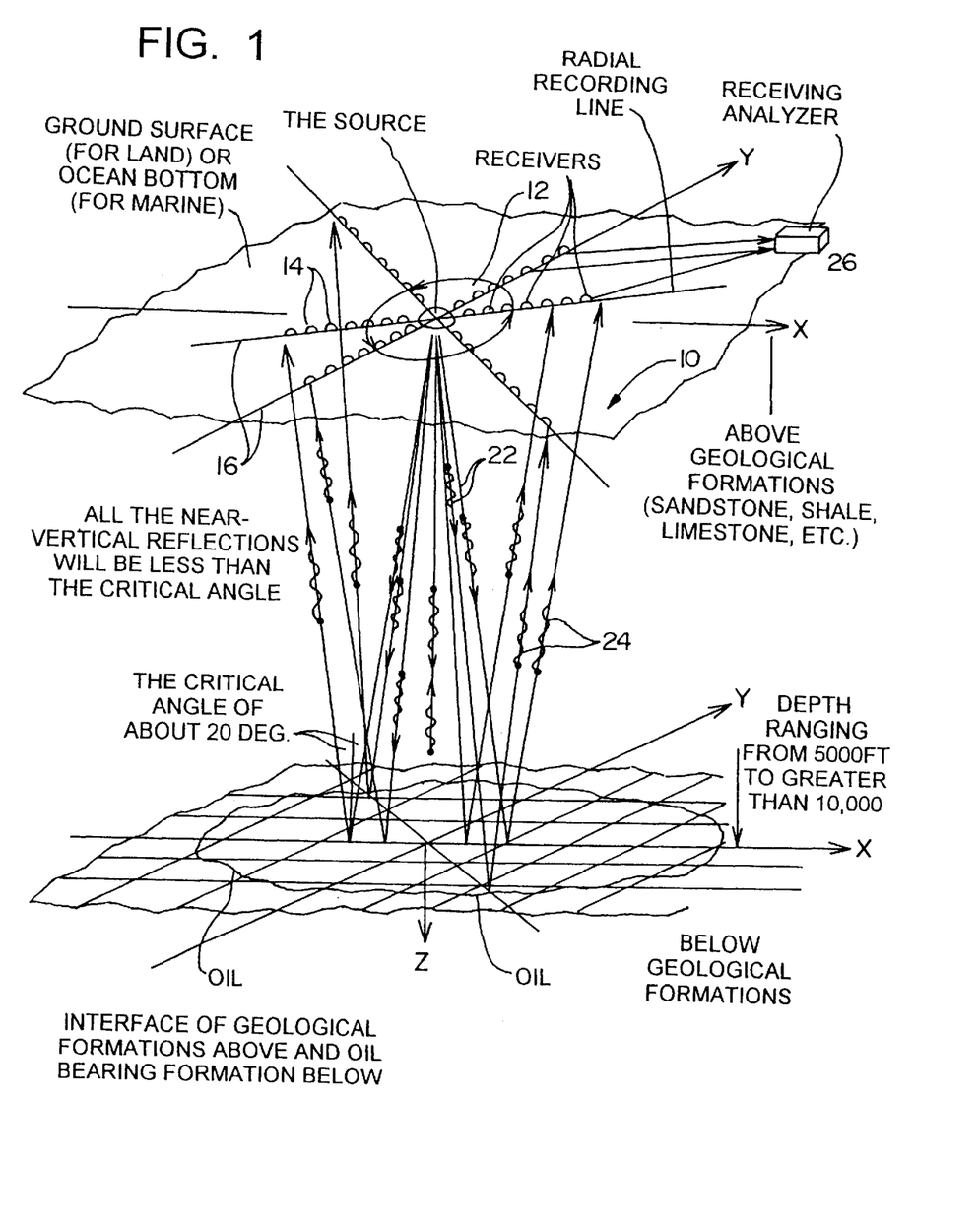
FIG. 1 is an isometric view showing schematically the system of the present invention being utilized in detecting directly the presence of an oil bearing formation, showing the wave or waves being transmitted from a central transmitter to the non-oil/oil interface at the oil bearing formation with reflected waves being detected by an array of antenna receivers.
Figure 2:
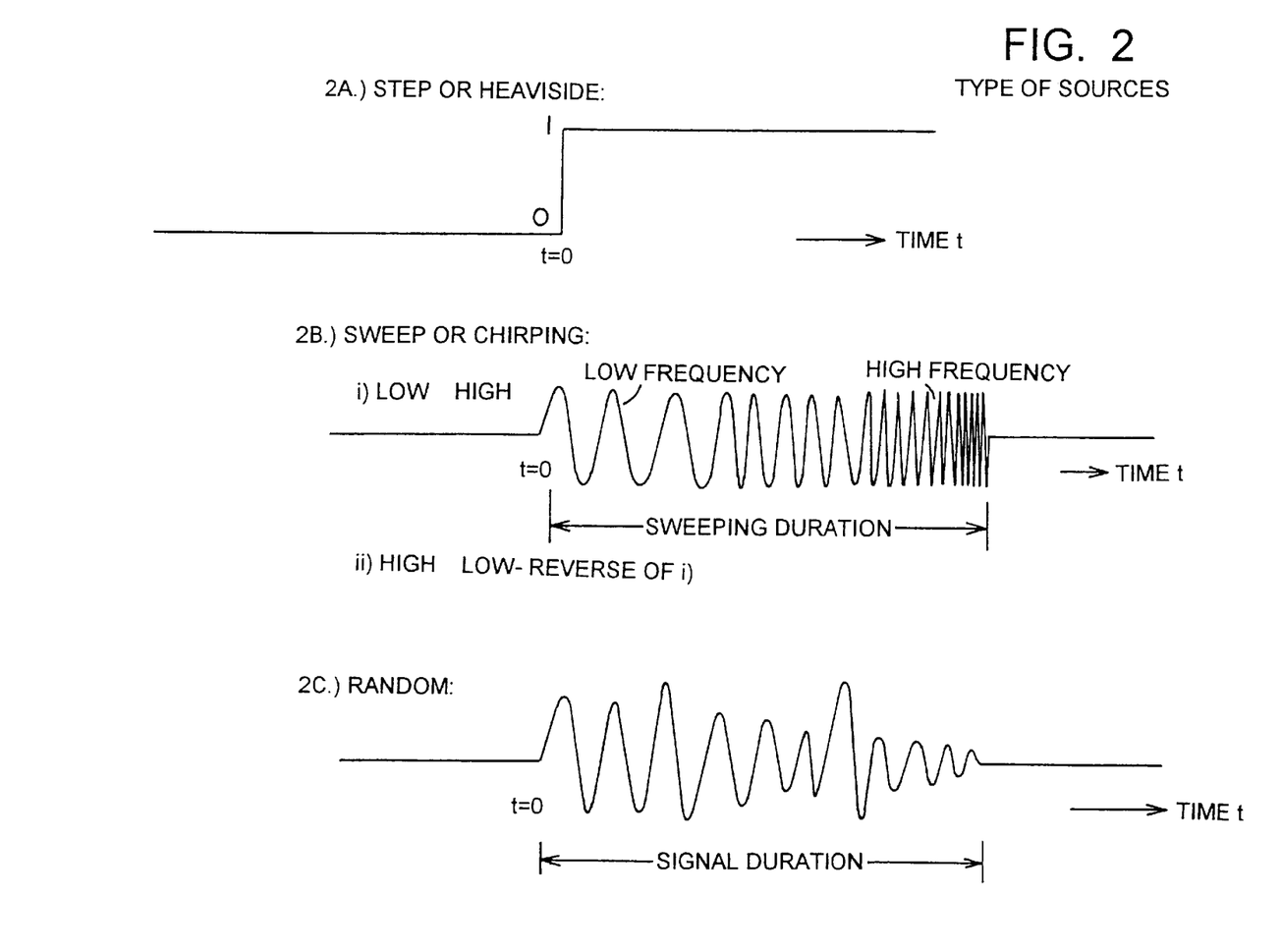
FIGS. 2A, 2B and 2C illustrate three types of the sources, namely, step or Heaviside, sweep (or chirping) and random, which desirably can be used in the present invention.
Figure 2A:
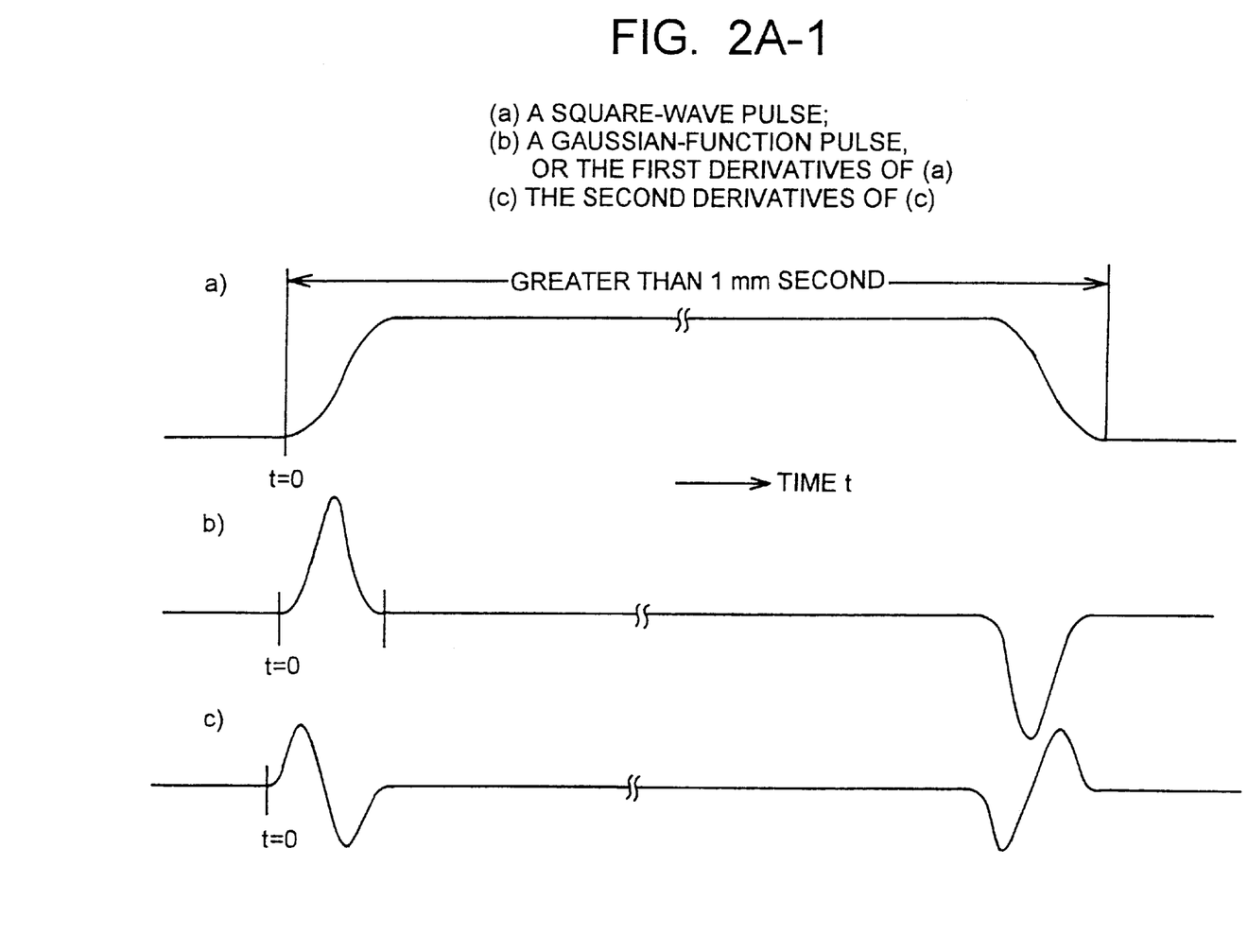

Reference is first made to FIG. 1, where there is shown schematically in an isometric view an upper ground surface or sea bottom where there is positioned a transmitter 12 (i.e. the source) and a plurality of antenna receivers 14 which in this particular arrangement are positioned 16 with respect to the source in the center, extending radially from the transmitter 12, with the antenna receivers 14 being at spaced locations along the receiving profiles 16. These profiles 16 of receivers 14 would be spaced from one another, and in the present embodiment the spacing would be about sixty degrees between each profile 16. Other arrangements of the antenna receivers are of course optional.

The wave or waves are directed from the transmitter 12 downwardly from the earth's surface into the underlying geological formations. As indicated above, the underlying geological formation or formations could be, for example, stratified formations of sandstone, shale, limestone, etc. At the bottom of FIG. 1, there is shown an oil bearing formation 20.

As the wave or waves 22 from the transmitter 12 travel downwardly, they are reflected at the interfaces in a generally cone shaped pattern. The reflection from the non-oil/oil interface is expected to be distinctly strong because of its large reflection coefficient. Then these waves 22 reach a non-oil/oil interface where the upper surface of the oil bearing formation 20 is in contact with the lower surface of the geological formation immediately above (thus forming the distinct non/oil interface). The waves 22 are reflected and/or refracted upwardly from the non-oil/oil interface, and they travel upwardly. These strong upwardly reflected waves are indicated at 24.

The various antenna receivers 14 are positioned and arranged to receive the reflected waves 24. These reflected waves that are received by the antenna receivers are in turn directed to a receiving/analyzing apparatus shown schematically as a rectangle 26. At that time (or at a later time) these received waves are analyzed in terms of their wave characteristics expected to be found in a reflected wave or waves then are reflected from a non-oil/oil interface.

With the foregoing being given as a general description of the method, reference will now be made to FIGS. 2A, 2B and 2C. FIG. 2A shows a first source waveform which can be utilized as the transmitted wave or waves in the present invention, this being a step or Heaviside waveform noting a step at the time t=o.

To discuss further the type of the source (FIG. 2A) step or Heaviside waveforms that is transmitted from the source 12, as indicated previously, can be an electric pulse of greater than one milisecond width as shown in FIG. 2A-1(*a*). Take the first rise of the step which is a realistic Heaviside or step, we use. The first derivatives of these two pulses are the Gaussian functions as shown in FIG. 2A-1(*b*). The second derivatives are typical of the waveforms of one peak and one trough as shown in FIG. 2A-1(*c*). FIG. 2A-1(*b*) represents the Gaussian-function source in FIG. 2A-1-bA, where the function is normalized by its peak. FIG. 2A-1-bB is its amplitude spectrum, which is also a Gaussian.

A second source waveform which can be used in the present invention is shown in FIG. 2B, and this is a sweep or chirping wave form. As shown in FIG. 2B, at time zero the waveform is at a lower frequency, and the frequency increases in time. The reverse can also be used (i.e. starting at a higher frequency to a low frequency so that the frequency decreases in time). For the chirping or sweeping source the frequency range could extend between 0.10–100 mHz.

In FIG. 2C, there is shown another source waveform which could be used, this being a random waveform where the frequency and/or amplitude, and other characteristics vary in random.

For further description of the present invention reference is now made to FIG. 3, 3A, 3B and 3C. FIG. 3 is a schematic representation which is taken along a vertical plane extending from the transmitting/receiving location on the earth's surface or sea bottom through several geological formations downwardly to the oil bearing formation 20. There are also shown in FIG. 3 three upper geological formations 26, 28 and 30, and a lowermost formation 32 immediately above the oil bearing formation 20. The formation 26 and 28 meet as the interface 34, and the formations 28 and 30 meet at the interface 36. As shown in FIG. 3, there may be other formations between the lowermost non-oil formation 32 and the formation 30, and these in turn would have their respective interfaces. The lowermost formation 32 that is immediately above the oil bearing formation 20 is the non-oil/oil interface designated at 38.

In FIG. 3, for clarity of explanation, only three transmitted waves are shown and three related reflected waves. There is a first transmitted wave component 40a which travels at an angle. When it reaches the interface 34, there is a reflected wave indicated at 40b, and this reaches the receiver R1 (the wave 40a is also refracted into the lower medium 28 and further downwardly to pass through the other interface 36, and on through other interfaces. For convenience of illustration these are not shown.)

Then there is the second transmitted wave 42a which is shown traveling to the interface 36, with a reflected wave at 42b. Finally, we have the third transmitted wave 44a which is shown traveling all the way to the interface 38, with the reflected wave being indicated at 44b.

In FIG. 3A, there are shown the waveforms which would be received when a step or Heaviside wave is transmitted into the geological formation as the transmitted wave. At 46, there is shown the source waveform which is excited at the sending location through the instrument system, which is referenced to time zero. Then at 48 there is the reflected waveform from the interface 34 of the geological formations 26 and 28. At 50 there is the reflected waveform from the interface 36 of the geological formations 28 and 30. Finally, there is shown at 52 the reflected wave 44b which is received from the non-oil/oil interface 38 are all analyzed.

Each of these waveforms 48, 50, 52 and also the other reflected waveforms resulting from interfaces between the interface 36 and 38 are analyzed.

It is this reflected waveform 52 which indicates the presence of an non-oil/oil bearing interface 20. It is important to note that this waveform 52 itself is analyzed to determine the character or characteristics of this wave to see if it matches a characteristic or characteristics of a waveform which would be expected to be received from a non-oil/oil bearing interface at the depth of that interface. The key is that the reflected waves from the interface of the non-oil/oil boundary will have at least 2% of reflection coefficient.

FIG. 3B(i) shows the observed or recorded "Electromagnetogram (EMG)" showing the various reflected waves which would result from the source of a sweep (or chirping) waveform or a random waveform. FIG. 3B(ii) shows the source waveform at 46a, and the waveform reflected at 48a, 50a and 52a. FIG. 3B(iii) shows the cross-correlation waveforms resulted from the source cross-correlated with the recorded electromagnetogram (EMG) of FIG. 3B(i). Substantially the same procedure is followed as described above with regard to the reflected waveforms 46, 48, 50 and 52. When it is found that the reflected waveform has the characteristic or characteristics of those that would be expected from a non-oil/oil interface, then the presence of the oil bearing formation is ascertained.

Figure 5:
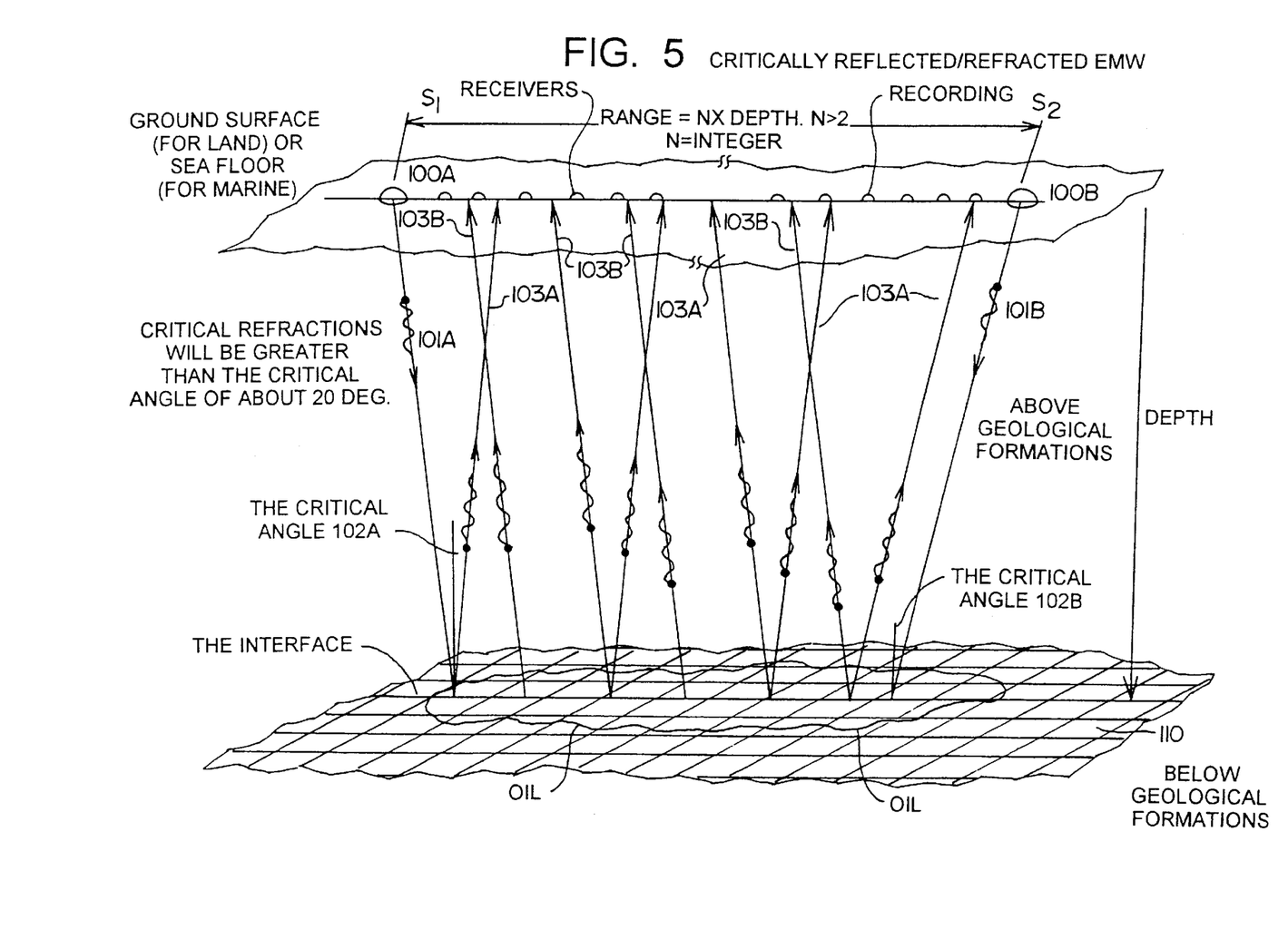
FIG. 5 is an isometric view of the critical refractions at an oil/non-oil interface.

FIG. 5 represents the configuration of the critical refractions at the non-oil/oil interface, 110, between the upper geological formations of non-oil bearing, and the lower geological formation of oil bearing. The source S1, 100A, transmits an electromagnetic wave, 101A, into the earth, which reaches the critical angle, 102A, the angle of refraction in the lower oil-bearing formation reaches 90 degree. The critically refracted waves are propagated into the upper medium as the critically reflected/refracted waves, 103A, to be recorded on the earth's surface or sear bottom. For a reversed profiling, the source S2, 100B, likewise, transmits an electromagnetic wave, 101B, into the earth. When it reaches the critical angle, 102B, at the interface of non-oil/oil bearing formations, the same wave phenomena as before occur to have critically refracted waves, 103B, which transmit into the upper medium as the critically reflected/refracted waves to be recorded on the earth's surface or sea bottom. The said critical angle for the present case of non-oil/oil bearing formations (above/below) is bout 20 degrees. The range of recording requires at least more than twice of the depth of interest. The favorable electromagnetic properties of the oil-bearing medium, particularly its low value of electric permittivity, in comparison with any other geological formations including water, thus would give strong reflections and refractions that directly indicate the presence of oil in the formation.

Figure 4:
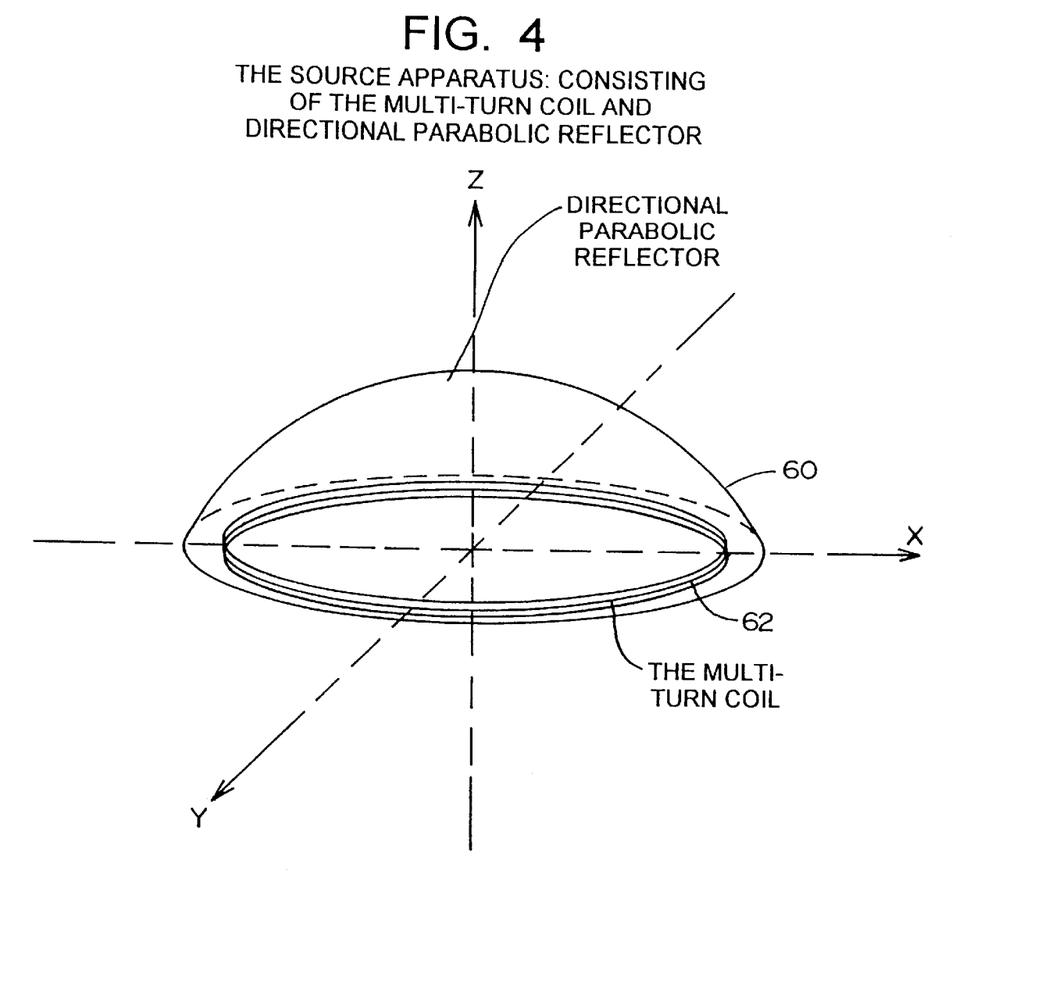
FIG. 4 is an isometric view showing rather schematically the parabolic reflector of the transmitter with its multi-turn coil.

The source (i.e. transmitter) is designed to operate at a very low frequency in the radio LF to UHF frequency range. This would have the capability of delivering power in the range of at least 10 to 100 kW or more with a voltage of 1000 volts or more and a current of 10 to 100 amperes or more. The source apparatus would utilize a parabolic directional reflector, which is shown in FIG. 4 as a multi-turn coil/parabolic-reflector indicated somewhat schematically at 60 in FIG. 4 (the coil being indicated at 62). The source 12 does not need to be limited to only a single source, but could be a multi-source, consisting of a number of multi-turned coil/parabolic reflectors which could be steered to give a beam forming synchronization.

Each of the receivers 14 is equipped with a directional impedance-matched antenna which is capable of receiving wide band electromagnetic signals. These receivers can be formed in a variety of patterns with respect to location of the source or sources 12, namely a linear or areal coverage or a radial coverage. The number of channels depends on the subsurface coverage for the electromagnetic imagery. Normally, at least 24, 48 or 96 channels are required for such an electromagnetic wave reflection.

It is to be understood that the various modifications and/or variation could be made in the present invention without departing from the basic teachings thereof. For example, present analysis indicates that the voltage could be about 1000 volts or more, and within the broader scope, it may be possible that in some situations the voltage could even be lower, or very much higher. This is also true of the range between 10–100 amperes. Thus there could be increases (or decreases) between 10%–50%, 50%–100%, 100%–500%, 500%–1000%. Also within those ranges, there could be increases or decreases in 10% increments, and these 10% incremental increases or decreases could vary beyond the range given above. The above description is intended to show preferred embodiments, and the claims are intended to cover other components and methods which, although not shown, are within the broader scope of the present invention.

What is claimed is:

1. A method of prospecting for oil by directly ascertaining presence of oil in the earth, where there is at least one upper, non-oil bearing geological formation which has a higher permittivity and which is in contact with an oil bearing geological formation immediately below which has a relatively lower permittivity to form a non-oil/oil interface, said method comprising:

a) transmitting an electromagnetic transmitted wave or waves downwardly through the upper formation to said interface, with the wave or waves being reflected and/or refracted upwardly from one or more interfaces of geological formations as reflected and/or refracted wave or waves;

b) receiving said reflected and/or refracted wave or waves as a received wave or waves at a receiving location or locations, with said received wave or waves having a reflected and/or refracted waveform or waveforms;

c) identifying from said received waveform or waveforms to ascertain presence of at least one waveform which is characteristic of a received waveform that is reflected and/or refracted from an interface of geological formation of contrasting permittivity of a non-oil/oil bearing interface.

2. The method of claim 1, wherein said waveform reflected and/or refracted from said non-oil/oil bearing interface is analyzed at least in part relative to strength of the reflected and/or refracted waveform characteristic of a refracted waveform characteristic of a non-oil/oil bearing interface of contrasting permittivity.

3. The method as recited in claim 1, wherein said transmitted wave or waves is a pulse or pulses having a pulse width or pulse widths at least as great as about one microsecond.

4. The method as recited in claim 1, wherein said transmitted wave or waves is a sweeping frequency wave form or forms.

5. The method as recited in claim 4, wherein said sweeping frequency wave or waves extend in a frequency range within 0.1 to 100 MHz.

6. The method as recited in claim 1, wherein said transmitted wave or waves are provided at a power input of at least about ten kilowatts.

7. The method as recited in claim 6, wherein said power input is at least about 100 kilowatts.

8. The method as recited in claim 1, wherein power input to provide said transmitted electromagnetic wave or waves is at a voltage level of at lest 1000 volts.

9. The method as recited in claim 1, wherein current of the power input to provide the transmitted electromagnetic wave or waves is at least about 10 amperes.

10. The method as recited in claim 9, wherein said current is at least 100 amperes.

11. The method as recited in claim 1, further comprising also ascertaining a received wave form or wave forms resulting from a transmitted wave or waves being transmitted into a first earth location where there is a first upper non-oil bearing foundation and a second lower non-oil bearing earth formation, which formations meet at a non-oil bearing interface of two non-bearing formations, and ascertaining received wave form or forms resulting from reflected and/or refracted wave or waves from said non-oil bearing interface, then ascertaining differences between the received wave form or forms from the non-oil/oil interface at the oil-bearing earth formation from the wave form or wave forms of the non-oil bearing interface to ascertain differences relating to said one or more wave form characteristics.

12. The method as recite din claim 1, wherein said non-oil/oil interface has a general alignment plane, and the transmitted wave or waves are directed toward the non-oil/oil interface along an alignment path which is at an angle with the alignment plane that is other than a right angle so that there is an angle of incidence with said alignment plane other than a right angle which is a critical angle for a non-oil/oil interface and ascertaining said differences relative to wave or waves aligned at said critical angle.

13. The method as recited in claim 12, wherein said critical angle is about 20°.

14. The method as recited in claim 11, wherein a difference in greater than expected strength of the received wave form or forms from the non-oil/oil interface is ascertained.

15. The method as recited in claim 11, wherein there is a lower non-oil bearing earth formation below said oil bearing formation, said method further comprising receiving a lower reflected wave or waves from a lower interface between the oil bearing formation and the lower non-oil bearing formation, said method further comprising also analyzing the lower wave or waves relevant to wave characteristics of such interface.

16. The method as recited in claim 11, further comprising:

a) establishing reference criteria for reflected and/or refracted waves that are reflected from both non-oil bearing interfaces and non-oil bearing/oil bearing interfaces, relating to one or more wave form characteristics which relate to the relatively low electric permittivity of oil and relatively strong reflections of electromagnetic waves for near vertical reflection and/or relatively strong refractions for wider angle refractions;

b) directing a plurality of electromagnetic waves at various selected geographical locations in an exploration area as transmitted waves, each having a transmitted wave form, downwardly into the earth formation, with the transmitted waves being reflected and/or refracted upwardly from an interface or interfaces as a reflected and/or refracted wave or waves;

c) receiving said reflected and/or refracted waves at receiving locations with said reflected and/or refracted waves each having a reflected and/or refracted wave form;

d) analyzing said reflected an/or refracted wave forms to ascertain similarities and/or differences between said reflected and/or refracted wave forms to ascertain differences from one or more of said wave forms that are selected relative to said wave form characteristics related to low permittivity of oil in the oil-bearing formation, and also relating these to the reference wave forms, to identify similarities land/or differences further and relating the received wave forms to their related transmitted wave forms and to the reference wave forms of reflected and/or refracted waves from non-oil bearing/oil bearing and non-oil bearing interfaces to ascertain location or locations of oil bearing interfaces.

17. The method of claim 16, further comprising:

a) directing a plurality electromagnetic waves as transmitted waves having transmitted wave forms, downwardly through the non-oil/oil interface, with the waves being reflected and/or refracted upwardly from the non-oil/oil bearing interface as reflected and/or refracted waves; said waves each having an angle of incidence relative to the non-oil/oil interface at the oil bearing formation, said non-oil/oil interface at the oil bearing formation having a critical angle of incidence, at least a first one of said waves having an angle of incidence less than the critical angle, at least a second of one of said waves having an angle of incidence approximately equal to said critical angle, and at least a third one of said waves having an angle of incidence greater than the critical angle;

b) receiving said reflected and/or refracted waves at receiving locations, with said reflected and/or refracted waves having reflected and/or refracted wave forms;

c) analyzing said reflected and/or refracted wave forms to ascertain a difference or differences between the transmitted wave forms and the reflected and/or refracted wave forms, relative to tone one or more of wave form characteristics relative to electric/electromatic characteristics of oil.

18. The method as recited in claim 17, wherein the critical angle for the interface at the oil bearing stratum is approximately twenty degrees.

* * * * *